Nov. 18, 1924.
J. K. NEUSCHEL
1,516,452
COUPLING FOR GASOLINE HOSE
Filed Oct. 18, 1923
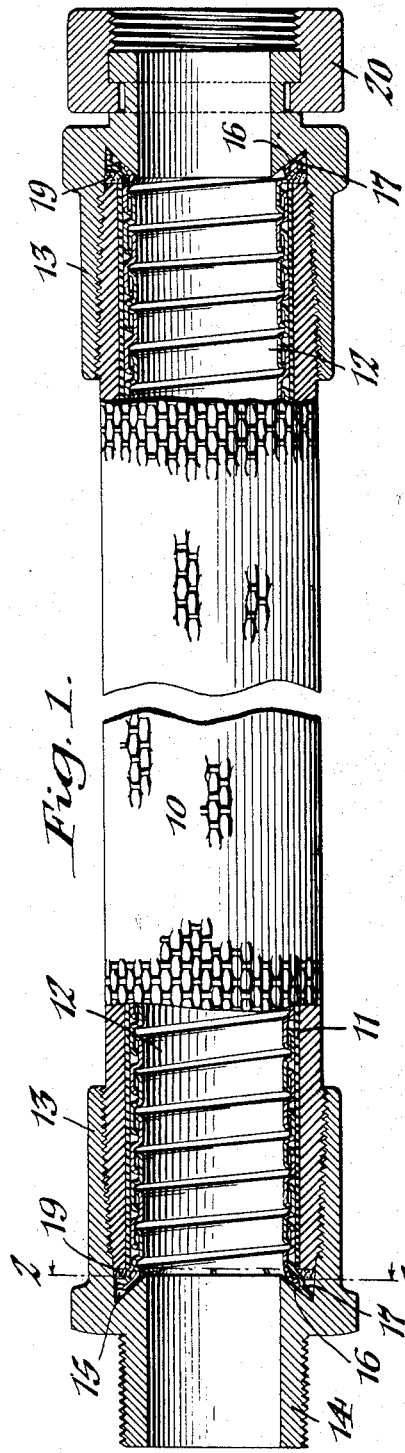
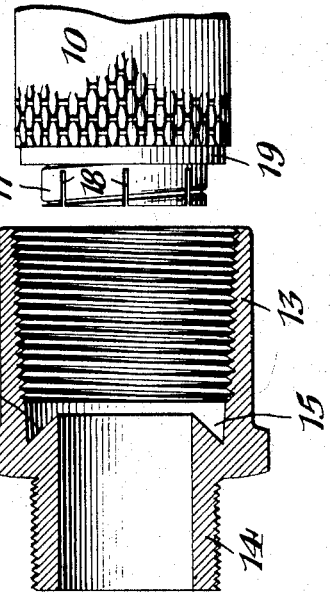
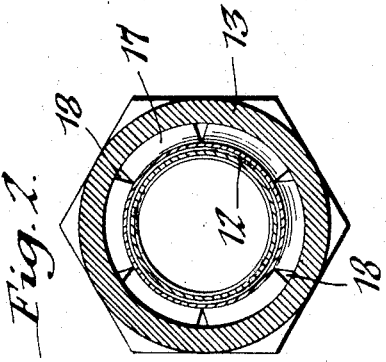
Inventor,
John K. Neuschel,
by Geyer & Geyer
Attorneys.

Patented Nov. 18, 1924.

1,516,452

UNITED STATES PATENT OFFICE.

JOHN K. NEUSCHEL, OF BUFFALO, NEW YORK, ASSIGNOR OF ONE-HALF TO DURAFLEX METAL HOSE CO., OF BUFFALO, NEW YORK, A FIRM COMPOSED OF WILLIAM E. DORRIES AND RAYMOND E. DORRIES.

COUPLING FOR GASOLINE HOSE.

Application filed October 18, 1923. Serial No. 669,374.

*To all whom it may concern:*

Be it known that I, JOHN K. NEUSCHEL, a citizen of the United States, residing at Buffalo, in the county of Erie and State of New York, have invented new and useful Improvements in Couplings for Gasoline Hose, of which the following is a specification.

This invention relates to a coupling which is more particularly intended for use in connection with a gasoline hose having a metallic liner.

Its chief object is to provide a simple durable and inexpensive coupling of this character which is constructed to positively bring the metallic liner of the hose into contact therewith, so as to provide the interior of the hose with an uninterrupted conductor extending from end to end thereof for carrying off any static charges of electricity and thereby render the hose non-static.

A further object of the invention is to provide a non-static hose in which the coupling member may be quickly applied to and removed from the hose by a single operation.

In the accompanying drawings:

Figure 1 is a sectional elevation of a gasoline hose embodying my invention. Figure 2 is a transverse section thereof on line 2—2, Fig. 1. Figure 3 is a sectional elevation, showing the relative arrangement of the parts before the same are connected.

Similar characters of reference indicate corresponding parts in the several views.

The improved coupling is applicable to any metal lined hose, that shown in the drawings, by way of example, consisting of an outer casing or cover 10 of woven fabric, a rubber filler 11 and a metallic lining 12, the lining being of spiral formation to render the hose more or less flexible.

Attached to either end of the hose is the improved coupling, that at one end serving to connect the hose with the gasoline pump of a supply station, while the coupling at the other end is adapted to receive a nozzle or similar fitting for filling purposes. Both couplings are substantially identical in construction and a description of one will suffice for both.

The coupling is preferably a one-piece metal structure having an internally-threaded sleeve 13 at one end and an attaching nipple 14 at its other end. This sleeve is adapted to be fitted firmly and snugly over the outer casing 10 of the hose, the threaded bore of the sleeve preferably tapering inwardly to cause the hose to be wedged or compressed tightly into engagement with the sleeve. The convolutions of the metallic lining 12 are wound in one direction and the bore of the sleeve 13 is threaded in the reverse direction, that is, if the lining is right-handed, the threaded bore of the sleeve is left-handed. By this construction and arrangement, as the sleeve is screwed on to the hose, its threads bite into and reliably grip the fabric cover 10 without in any way twisting or distorting the metallic lining. In the fully applied position of the sleeve, shown in Figure 1, the fabric cover of the hose is firmly compressed and forced into the threads of the tapered sleeve-bore, the metallic lining constituting a firm backing for withstanding the resulting wedging action which takes place, thereby insuring a tight fit of the sleeve on the hose.

As shown in Figs. 1 and 3, the internal diameter of the sleeve is somewhat larger than the corresponding diameter of the attaching nipple 14, and in the resulting shoulder or offset there is formed a comparatively shallow annular groove 15 facing in the direction of the sleeve 13 and having an inclined or bearing face or contact seat 16 sloping toward the outer wall of the groove. The metallic liner 12 of the hose is adapted to contact with this seat for the purpose of providing an uninterrupted electric conductor from one end of the hose to the other and guarding against static discharges of electricity produced by the passage of the gasoline through the hose. In order to insure a perfect contact of this metallic liner with the coupling, the outer casing 10, together with the rubber filler 11, is cut back from the end of the hose in any suitable manner to provide the liner with an exposed portion or extension 17. The latter, as shown in Fig. 1, is adapted to occupy the annular groove 15 and make contact with its inclined seat 16, which constitutes a guide for directing the liner-extension into the groove and expands it in the form of a flange. This flange bears with its flaring side or face against the inclined seat 16, providing an extensive and reliable metal to metal contact. In order to facilitate this expansion of the liner-extension, the same may be provided with longitudinal slits 18 forming intervening elastic contact tongues.

To provide a fluid-tight joint between the hose and the coupling, a gasket 19 is applied to the liner extension 17 to bear at one side against the adjacent end of the cover and filler 11 of the hose, while its opposite side bears against the expanded portion of the liner extension, as shown in Fig. 1.

The simple one-piece construction of this coupling requires but a single operation to connect it to the gasoline hose and insures a positive and extensive metal to metal contact between the hose liner and the coupling, thereby eliminating any danger of static discharges of electricity which are liable to cause explosions. Furthermore, the device does not require skilled workmen to effect its assemblage.

The coupling at the right hand end of the hose shown in Fig. 1, which is adapted for connection to a gasoline pump, may be provided with a swivel attaching nut 20.

I claim as my invention:

1. The combination with a hose having a fabric cover and a metallic liner of spiral formation of a one-piece coupling attached to the end of the hose, said coupling having a tapered internally-threaded portion for engaging the cover of the hose and a contact seat arranged for engagement with the metallic liner of the hose, the threads of the coupling being opposite to the windings of the hose liner.

2. The combination with a hose having an unthreaded fabric cover and a metallic liner of spiral formation of a one-piece coupling attached to the end of the hose, said coupling having a tapered internally-threaded portion for engaging the cover of the hose, and a comparatively shallow annular groove formed at the inner end of said threaded portion for receiving the metallic liner of the hose, said liner having a surface contact with a wall of said groove, the threads of the coupling being opposite to the windings of the hose liner.

3. The combination with a hose having a fabric cover and a metallic liner, the liner extending beyond the corresponding end of the cover and having longitudinal slits forming intervening contact-tongues, of a one-piece coupling attached to the end of the hose, said coupling having an internally threaded portion for engaging the cover of the hose, and a rearwardly-facing internal groove in the inner end of said threaded portion having an inclined contact-seat, said tongues being flared and bearing against said seat, and a gasket applied to said liner and confined between the end of said fabric cover and said tongues.

JOHN K. NEUSCHEL.